Figure 1:
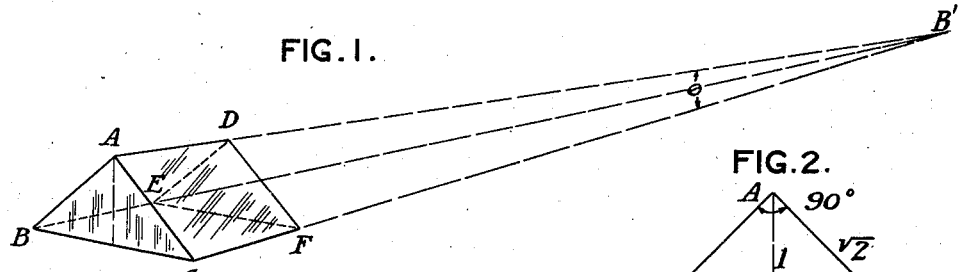

May 13, 1947.  J. H. McLEOD ET AL  2,420,606
WORKHOLDER FOR USE IN GRINDING AND POLISHING A TRANSMISSION
SURFACE OF A ROOF PRISM
Filed July 3, 1943  2 Sheets-Sheet 1

JOHN H. McLEOD
JOHN R. TURNER
*INVENTORS*

BY
*ATTORNEYS*

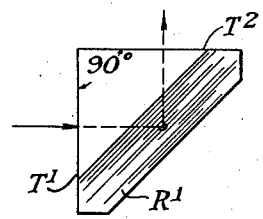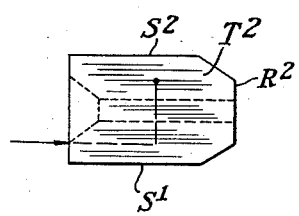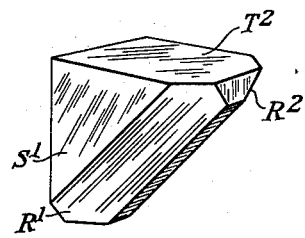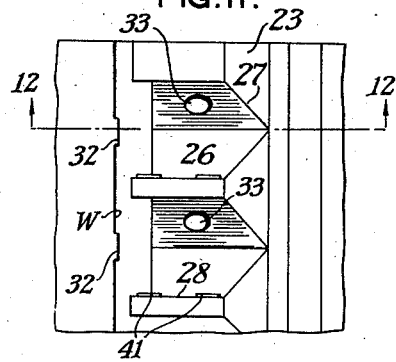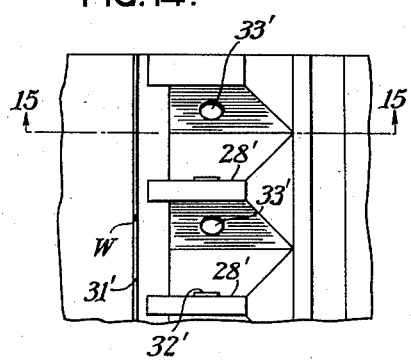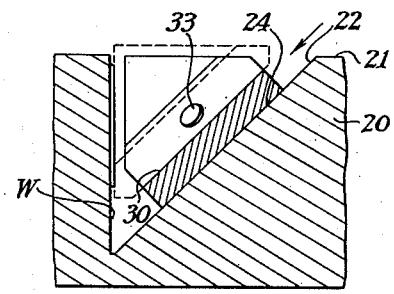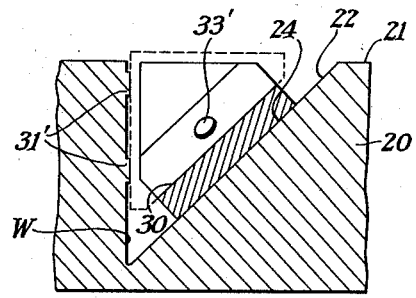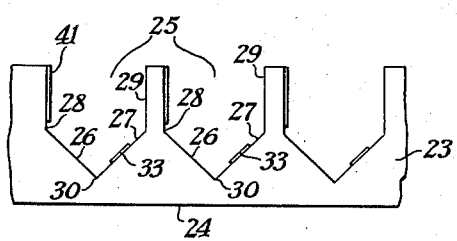
JOHN H. McLEOD
JOHN R. TURNER
INVENTORS Patented May 13, 1947

2,420,606

UNITED STATES PATENT OFFICE 2,420,606

WORKHOLDER FOR USE IN GRINDING AND POLISHING TRANSMISSION SURFACES OF ROOF PRISMS

John H. McLeod and John R. Turner, Rochester, N. Y., assignors to Eastman Kodak Company, Rochester, N. Y., a corporation of New Jersey Application July 3, 1943, Serial No. 493,352

4 Claims. (Cl. 51—216)

The present invention relates to the manufacture of optical prisms, and particularly to a method and apparatus for speeding up the production of optical prisms while at the same time maintaining the highest degree of accuracy in the critical features thereof.

The conventional method of manufacturing optical prisms is to grind the prism surfaces by hand and then to block them in plaster of Paris to polish the surfaces. More recently prisms have been waxed into "V-blocks" for grinding and sometimes polishing, in an effort to speed up production. In this procedure, considering a prism having three surfaces, the prism is seated in a V-groove having plane walls in a blocking tool with two surfaces of the prism engaging two surfaces of the groove and being supported thereby so that the third face is exposed above the top surface of the blocking tool to the polishing action of a suitable polishing tool.

This procedure has not proved entirely satisfactory for a number of reasons, the chief ones of which are worthy of mention to bring out the merits of the present invention. First, it has proved costly, and sometimes impractical, to make the "V-block" with sufficient accuracy. Secondly, the prisms are not properly seated in the block due to inaccuracy in the blocks, inaccuracy in the ground surfaces of the prism, or inaccuracy in mounting. And finally fundamental factors have been overlooked in the design of the block. It is primarily with the last two-mentioned faults that the present invention is concerned. In addition, since all of the surfaces, or at least two surfaces in a three-sided prism, must be accurately hand ground to permit its cooperation with a conventional V-groove in order to accurately control the plane of polishing of the third surface, this procedure in reality overcomes the hand grinding operation on only one side, and, therefore, increases production only to a limited extent.

It would seem almost obvious that any prism must be securely seated in its V-groove in the blocking tool if it is to be made with accurate angles. This is accomplished according to the present method by kinematically locating and supporting the prism in a V-groove, or other recess of suitable configuration to seat the prism in question, with the surface thereof to be worked exposed to the grinding and polishing tool. Kinematic location and support of a prism is accomplished according to the present invention by locating one surface of the prism, not by a plane surface, but on a plurality of spaced surfaces which will determine a plane, and by locating a second surface of the prism by only a line contact or an elongated area. If there is a third side in the block, as in some of the more complicated prisms, it is located by a small area.

Each type of prism has a definite optical function to perform and, accordingly, errors in the various angles of a prism affect its performance in different ways. Some angles may have to be held to very close tolerances, while other angles may be more or less insensitive. A thorough knowledge of the function, and thus the manufacturing tolerances, is necessary to the intelligent design of the tools and procedures for making the important angles of a prism accurately. Another important consideration in the manufacture of some prisms is the pyramid error.

One object of the present invention is to provide a method of grinding and polishing optical prisms by means of which the critical angle and/or the pyramid error of the prism can be accurately controlled.

And another object is to provide a method of grinding and polishing prisms as set forth which eliminates all hand polishing and grinding operations, and eliminates the necessity of repeatedly measuring the angles of the prism during the grinding and polishing thereof.

A further object is to provide a method of grinding and polishing prisms which steps up their production appreciably, while at the same time making it possible to meet the most rigid tolerances required in the prism angles.

Another object is to provide a method of the type set forth which includes the step of kinematically locating and supporting a prism in a blocking tool so that a surface to be ground is located in a definite relation to the plane of grinding and polishing by and in relation to a surface previously ground and polished.

Another object is to provide a method of grinding and polishing a prism in order to control a critical angle thereof which comprises grinding and polishing one of the surfaces bounding the angle, then using said finished surface to locate the other surface of said prism relative to the grinding plane to provide the angle desired.

And another object is to provide a method of grinding and polishing a Porro prism in order to control the critical 90-degree angle and the pyramid error which comprises the steps of finishing the hypotenuse surface, then locating one reflecting surface relative to the grinding plane by means of the finished hypotenuse surface and finishing the same, and then locating the other reflecting surface relative to the grinding plane by use of the finished reflecting surface, and grinding and polishing said surface, said grinding plane being parallel to the edge of the dihedral angle formed by the hypotenuse surface and the first reflecting surface finished so that pyramid error is accurately controlled.

And another object is to provide a prism blocking apparatus by means of which a prism can be positioned so that one surface thereof will be in a plane in definite angular relation with another surface thereof, and upon which the success of the present method of grinding and polishing depends.

And another object is to provide a prism blocking apparatus by means of which a prism is adapted to be kinematically located and supported with one surface exposed for grinding in a plane in definite angular relationship to a previously finished surface.

And another object is to provide a prism blocking apparatus of the type set forth which comprises a block having a recess of suitable configuration to seat the prism with one surface exposed for grinding and polishing, said recess including means for engaging a previously finished surface of the prism at a plurality of spaced points which determine the plane of said surface, and means for engaging a second surface of the prism in a line contact which permits the prism to tilt relative thereto to insure accurate location of the first-mentioned surface by the plane defining means. If there is a third surface to be supported, as in some more complicated prisms, it is supported by a small area.

And another object is to provide a prism blocking apparatus which is so designed that it can be machined to close tolerances without difficulty, and which is adapted to accurately position the prism by the application of a pressure substantially normal to the exposed face thereof, and firmly hold the prism in place in such a way that the corners of the prism are not subjected to a pressure which is liable to chip the same.

And another object is to provide a set of prism blocks adapted for use in grinding and polishing the respective surfaces of a prism in order to control a critical angle thereof and/or the pyramid error therein.

Figure 2:
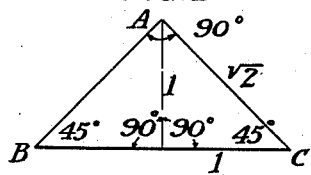
Figure 3:
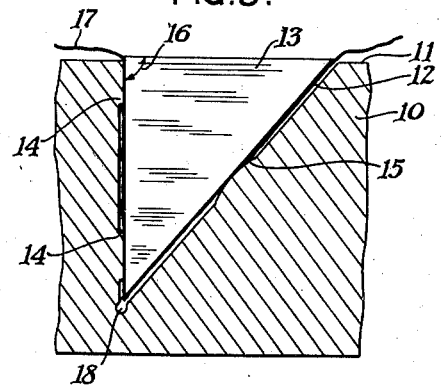
Figure 4:
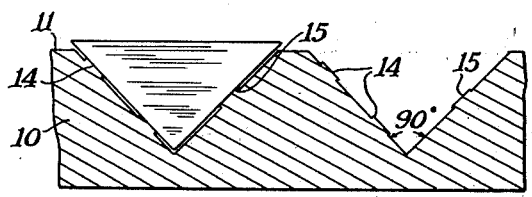
Figure 5:
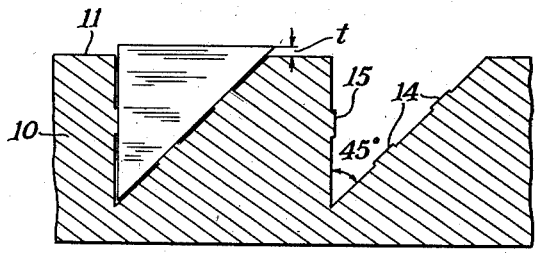
Figure 7:
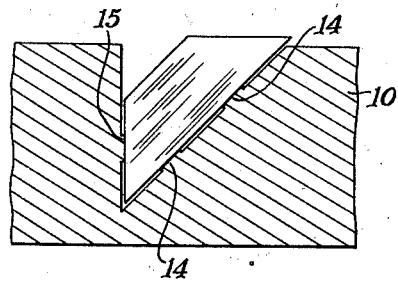
Figure 6:
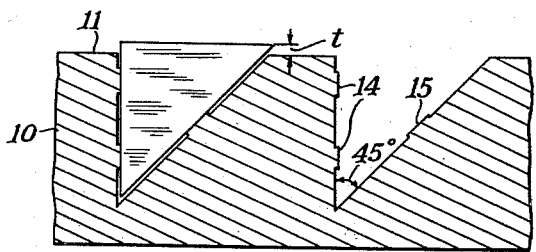

The novel features that we consider characteristic of our invention are set forth with particularity in the appended claims. The invention itself, however, both as to its organization and its methods of operation, together with additional objects and advantages thereof, will best be understood from the following description of specific embodiments when read in connection with the accompanying drawings in which, Fig. 1 is a perspective view of a 45°–90° prism with its edges extended, on exaggerated scale, to show the concept of pyramid error in a prism, Fig. 2 is an end view of the prism shown in Fig. 1, Fig. 3 is a partial vertical section of a blocking tool constructed in accordance with a preferred embodiment of the present invention, and adapted to kinematically locate and support a right angle prism for the finishing of one transmission surface thereof, Figs. 4, 5, and 6 are partial vertical sections of a set of three blocking tools used in the grinding and polishing of the three surfaces of a Porro prism to control the 90° angle thereof and the pyramid error, Fig. 7 is a partial vertical section of a blocking tool for use in the finishing of Dove prisms, Figs. 8, 9, and 10 are three views of a roof prism the manufacture of which can be speeded up and controlled by the present method and apparatus, Fig. 11 is a top plan view of a part of a blocking tool adapted to kinematically locate and support the roof prism shown for the finishing of the first transmission face thereof in order to obtain an accurate 90° between the side walls of the prism and the planes of the transmission surfaces, Fig. 12 is a vertical section taken substantially on line 12—12 of Fig. 11, and with a roof prism indicated as positioned thereby, Fig. 13 is a partial elevational of a saw-tooth bar adapted to be set in a V-groove in the blocking tool to form the recesses for the prisms, Fig. 14 is a plan view of a blocking tool adapted to kinematically locate and support the roof prism for the finishing of the second transmission surface in order to obtain an accurate 90° angle between the two transmission surfaces, and Fig. 15 is a vertical section taken substantially on line 15—15 of Fig. 14, and with a prism indicated as positioned thereby.

Like reference characters refer to corresponding parts throughout the drawings.

According to the present invention, means is provided for mounting an optical prism in a blocking tool so that it will not only be held securely, but by means of which one surface thereof may be accurately positioned relative to the grinding and polishing plane by using the proper prism surface as the locating means for the prism. This is accomplished by providing a means for kinematically locating and supporting a prism, a kinematic supporting and locating means being one which provides for a relative adjustment of the part being supported so that it will assume a definite orientation depending upon the cooperation of cooperating parts of the support and the prism to be supported. The discovery of a locating and supporting means for an optical prism of the type set forth has made possible a novel method of grinding and polishing optical prisms by means of which the critical angle of the prism, as dictated by the specific use of the prism, can be accurately controlled and/or pyramid error can also be controlled if the same is of importance. The method has to do with the order in which the surfaces of the prism are to be ground and polished, and the order is determined by the function that the prism is to perform.

As pointed out above, an important consideration in the manufacture of some optical prisms is pyramid error. Since this term is one that is rather loosely referred to it is deemed advisable to state at this point just what we have in mind when we refer to pyramid error throughout the specification. If a three-sided prism has its sides extended, it will taper off to a point, and form a pyramid, if it has pyramid error. This is shown on an exaggerated scale in Fig. 1. In order to be precise, we shall define the pyramid angle as the angle between the plane of one side of a triangular prism and the line of intersection of the other two sides. Referring to Fig. 1, the pyramid angle of the triangular prism shown would be the angle $\theta$ between the dihedral edge AD extended to the point of intersection B′, and the plane BEFC extended to the point B′. Or, it will be appreciated that the pyramid angle might be measured in terms of any one of the three dihedral edges and the plane of the surface there-opposite. As thus defined, a perfect prism would have zero pyramid angle because the dihedral edges would be mutually parallel and would not meet in a point no matter how far they were extended.

Since the present method of grinding and polishing prisms is dependent upon an apparatus by means of which a prism can be accurately located and securely supported relative to the grinding and polishing plane, it may be well to describe the prism blocking apparatus constructed in accordance with the present invention first. Inasmuch as the specific blocking means will vary slightly with different forms of optical prisms which are to be blocked, the arrangement provided for blocking triangular prisms, which is a very representative case, will be described in the first instance. This embodiment will serve to clearly point out what we mean by a kinematic support for the prism and how such a locating and supporting means accurately locates the prism relative to the grinding and polishing plane and in turn provides a means of securely holding the prism during the grinding and polishing operation.

As is well known in the art, prisms are ground and polished by mounting, or blocking, the same individually, or in groups, on a block with the surfaces to be worked exposed and located in a single plane above the top surface of the block. The block is then rotated or oscillated in a plane parallel to the exposed surfaces while a grinding and polishing tool capable of rotation or oscillation in a plane is brought into contact with the prism with a downward pressure normal to the surfaces of the prism being ground.

The blocking apparatus according to the present invention will be set forth in the first instance in the form it might take for blocking a right-angle prism having three sides, and which is probably the most common type of prism. Referring now to Fig. 3, wherein is shown a preferred embodiment of a blocking means for a right-angle prism, 10 is a conventional block having a top surface 11 which is adapted to be located parallel to the grinding and polishing plane when the block is mounted on any suitable driving spindle, not shown, relative to a grinding and polishing tool, not shown, mounted to move in a plane for the grinding and polishing operations and to move bodily vertically relative to said plane to apply the necessary working pressure to the work. The top surface of the block 10 is provided with one or more V-grooves 12 into which the prism 13 is adapted to be inserted, as shown. Instead of having the walls of the V-groove smooth as is common practice, according to the present invention the walls of the grooves are undercut to provide two or more locating and supporting surfaces 14 on one wall and one locating and supporting surface 15 on the other wall.

The plurality of locating and supporting surfaces 14 are for the purpose of engaging one surface of the prism and locating said surface in a given plane in order to bring a complementary surface of the prism into a definite relation to the top surface of the block or the plane of grinding. Accordingly, the supporting surfaces 14 may be a pair of spaced supporting bars extending parallel to the vertex of the groove, as shown, or a plurality of supporting surfaces located in spaced triangular relation could be provided instead and accomplish the desired purpose. It is conceivable that a smooth wall could be left in a groove for this purpose providing it was possible to make the wall and the surface of the prism which was to engage it, both perfectly flat so that the two would be in perfect engagement. However, since this is difficult to accomplish from a practical commercial standpoint, we prefer to use a plurality of spaced supporting surfaces 14 to locate the surface in the groove.

The single locating surface 15 on the other wall of the groove is for engaging a second surface of the prism in such a way that the prism is adjustable relative to the wall of the groove including locating surface 15, the adjustment being of a nature to permit and cause proper engagement of another face of the prism with the locating surfaces 14. In the present instance, the single locating surface extends longitudinally of the groove parallel to the vertex thereof, and is adapted to engage one surface of the prism to prevent the prism from bearing to one side or the other. It is believed that it will be obvious that when the prism 13 is inserted into the groove in the manner shown in Fig. 3 and a downward pressure is applied to the exposed surface thereof, that the single locating surface 15 will engage the hypotenuse surface and will, by virtue of its line contact therewith, permit and cause the confined transmission surface of the prism to be accurately located against the locating and supporting surfaces 14. Accordingly, if the locating surfaces 14 are machined so that the plane they define is accurately 90 degrees with respect to the top surface of the block, and the transmission surface engaging them has been previously finished, then the angle 16 generated by grinding and polishing the exposed transmission surface will be 90°.

The single supporting surface 15 should be rounded as shown so that there will be no sharp corners to scratch the surface of the prism as the same slides over and tilts about said surface during the location of the prism in the block. By the same token, the corners of the supporting surfaces 14 should be rounded off, although the prism surface engaging this surface never tends to tilt thereabout. Surfaces 14 and 15 in combination provide a kinematic locating and supporting system for the prism relative to the top surface of the block because they permit, and cause, an orientation of the prism which will definitely locate one surface of the prism relative to the top surface of the block during the time the prism is being located thereby, and thereafter will securely hold the prism in the desired position of orientation so long as a normal downward force acting between the plane and line of support making up the system is applied to the surface, as is true during the grinding and polishing operation of any one surface of the prism.

Therefore, throughout the specification and the claims of this application when we refer to a kinematic locating and supporting means for a prism, we mean "a plurality of spaced selected prism supporting areas, defining a plane, which are adapted to be engaged by a previously finished surface on a prism to locate said surface in said defined plane and a third selected prism supporting area, spaced from the first-mentioned areas, and adapted to engage an opposed surface of the prism in such a way that a resultant downward pressure on a third surface of the prism acting between the supported surfaces of the prism will permit, and cause, an orientation of the prism which will definitely locate the first surface in the plane defined by the plurality of selected supporting areas, and thereafter securely hold the prism in this desired position of orientation." In addition, while we refer to one of the prism supporting areas as a line of support for one surface of the prism, it is pointed out that the supporting surface need not, and preferably is not, a sharp edge but is an elongated area which is sufficiently narrow to allow the same to act as a fulcrum for the surface of the prism supported thereby.

While the supporting surfaces may extend from the walls of the groove by any amount, or in fact be suitably mounted bars rather than formed from the walls of a groove as shown, we have found that the walls of the groove need be undercut only a few thousandths of an inch (less than .010 and preferably .003 of an inch) where polished surfaces are being blocked upon. However, where rough surfaces are being blocked upon, it is important that a greater under-cut be used to prevent the prism from resting against an accidental projection which would improperly locate the prism and give poor support.

The undercut portions of the walls of the groove may be filled with wax to help support the portions of the prism surfaces not supported by the surfaces 14 and 15 and to help hold the prism in position in the groove. It is essential that the undercut be very shallow since waxes are very weak materials and would fail to give sufficient support under flexure if a very thick layer were bearing the load. Furthermore, we have found that shallow undercuts are desired because they eliminate distortion in the prism, and which distortion is so small that it is measured in wave lengths of light. While the wax may be forced into the undercuts in any one of a number of ways, we have found that this can be done easily and efficiently by laying a strip of excessively waxed paper 17 of uniform thickness in the groove before the prism is inserted therein, as shown in Fig. 3. Then after the prism is properly seated on the supporting surfaces the block can be heated sufficiently to melt the wax, whereupon that between the locating surfaces 14 and 15 and the prism surfaces will be forced out into the undercut to fill the same. The paper being of very uniform thickness will not affect the proper location of the prism by said kinematic locating and supporting system.

As clearly shown in Fig. 3, the bottom of the V groove is cut out as shown at 18 so that the corner of the prism extending into the groove is not subjected to pressure which would tend to chip the same. It will also be noticed that by virtue of the present arrangement, pressure is applied to parts of the prism surfaces well removed from the corners of the prism so that chipping of the corners due to such points of pressure are eliminated. This is a decided improvement over the prior art arrangements in which the prisms are inserted into V-grooves having smooth walls which provide an over-rigid support for the prism, as distinguished from the present kinematic system of support, because in such a rigid supporting system the pressure is concentrated on the surfaces of the prism adjacent the corner in the groove with the result that chipping of the corners due to this pressure is very prevalent.

Plane defining locating surfaces 14 may be located on either wall of the V-groove, and the wall of the groove on which they are to be located will depend upon the angle of the prism which is critical, all as will be fully set forth below in describing our novel method of grinding and polishing prisms.

Having described our novel arrangement for kinematically locating and supporting prisms in a blocking tool so that a prism can be positioned with the surface to be ground and polished in a definite and known relation with respect to another surface thereof previously finished, we will now proceed to describe our novel method of grinding and polishing prism blanks which makes use of and depends upon said novel blocking apparatus. Inasmuch as the method in each instance varies with the type of prism and/or the functions of the prism, it is desirable to consider the procedure involved in the manufacture of several of the more common type of prisms.

Considering first of all, the Porro prism; this prism is of the constant deviation type, and it is important that the deviation be very nearly 180°. The angle that controls the deviation is the 90-degree angle, and for this reason the emphasis in manufacture of this prism should be on the generation of the 90-degree angle, rather than on the somewhat unimportant 45-degree angles. Pyramid error is also of some consequence in this prism. As set forth above, the pyramid angle of the prism is the angle between the plane of one side of a triangular prism and the line of intersection of the other two sides. We can then refer to pyramid angle or pyramid error with respect to the 90-degree edge or the 45-degree edge of a right-triangular prism, and the pyramid angle will have different values depending upon the reference edge. Furthermore, it will be obvious, we believe, that there can be no pyramid error in a triangular prism until the third side is generated, because the generation of the first two sides merely forms one reference edge which is the vertex of the dihedral angle formed by the two sides. In addition, it is believed that it will be understood from an inspection of Figs. 1 and 2 that the pyramid angle with respect to the 90-degree edge is $\sqrt{2}$ times the error with respect to the 45-degree edge of a 45–90 triangular prism. Accordingly, the pyramid error in a 45–90 degree prism will be kept to a minimum if one of the short surfaces is ground last.

We shall now proceed to describe a set of prism blocks for the manufacture of Porro prisms and the sequence of operations that are in accord with the invention and the above introduction. While the prisms may be handled individually, we will consider them handled as Porro prism sticks which have been made in the usual way from individual prisms waxed together end to end, after having had their ends ground planoparallel.

The first prism block is a 90-degree block as shown in Fig. 4, this designation being used for the reason that the top surface of the block is provided with a 90-degree V-groove. The groove is undercut to provide two locating bars 14 on one wall and one locating bar 15 on the other wall merely to give kinematic support to the prism stick, as fully set forth above. No special accuracy is required in this block, and the prisms are waxed into place and the hypotenuse surface is ground and polished plano. The reason for doing the hypotenuse surface first will be explained hereinafter.

The second blocking tool is a 45-degree block, as shown in Fig. 5, for grinding and polishing one of the reflecting surfaces of the prism. Two locating bars 14 are formed on the 45-degree wall of the groove and one locating bar 15 is formed on the 90-degree or vertical wall. This block controls one 45-degree angle of the prism and, therefore, the two bars 14 should be machined with fair accuracy so that the plane defined thereby will be truly 45° with respect to the top surface of the block which will be parallel to the plane of grinding when the block is mounted on the grinding and polishing machine. As shown in Fig. 5, the previously finished hypotenuse surface of the prism is located in this block by the two supporting bars 14 so that this surface in combination with said bars 14 controls the final plane of the first reflecting surface and, therefore, the dihedral angle formed by the surface and the hypotenuse. The prism should be ground until the thickness of the exposed portion above the top surface of the block, and indicated by the dimensions $t$ in Fig. 5, is the same on both sides of the prism at any point on the block. This will insure the dihedral angle being 45° and eliminates the necessity for repeatedly measuring this angle during the manufacture of the prism in order to determine when it is correct.

The third blocking tool is a 45-degree block, as shown in Fig. 6, but it has the two locating bars 14 on the 90°, or vertical, wall of the groove. The prism after having the hypotenuse surface and one reflecting surface finished in blocks #1 and #2 is mounted in this block with the finished reflecting surface engaging the two locating bars 14, as shown, for grinding and polishing the second reflecting surface. This is the really important block in the manufacture of Porro prisms because it controls both the 90-degree angle of the prism, which is the critical one, and also controls the pyramid angle. Accordingly, locating bars 14 on the vertical wall of the groove must be machined so that the plane defined thereby makes an accurate 90-degree angle with the top surface of the blocking tool. In addition, each groove should be of the same depth from end to end, otherwise pyramid angle errors will occur in the prism. Stating it more accurately, if the prism does not actually engage the vertex of the V-groove, as shown, the locating bars 14 and 15 should be machined so that they will accurately kinematically locate and support the prism so that the reference edge of the prism formed by the intersection of the finished hypotenuse surface and the first reflecting surface will be truly parallel to the top of the block. The prisms should be ground until the dimension $t$ between the top of the block and the exposed surface of the prism, see Fig. 6, is the same all around the block.

The question might be asked, "Why not use the two 45-degree blocks first, and then the 90-degree block last?" It is only when the third surface is generated that the pyramid angle has any meaning, as above set forth. It was pointed out earlier that the pyramid error is $\sqrt{2}$ times greater with reference to the 90-degree edge than with respect to the 45-degree edge. Therefore, the prism should be blocked with respect to the 45-degree edge when the third and last surface is generated. One might also suggest using similar blocks for the second and third surfaces, under the assumption that since this would make two accurate 45-degree angles, therefore the 90-degree angle should be good. However, the two errors in the 45-degree angle would then add up to make the error in the 90-degree angle which is the critical one.

So far as we are aware, the present method of manufacturing Porro prisms is radically different from that commonly practiced. In the first place, it is the usual practice in the manufacture of Porro prisms to grind and polish the two short sides first and hypotenuse last, primarily because the hypotenuse offers the greatest supporting surface; and with hand polishing operations and inadequate blocking means heretofore used, it was necessary to grind and polish the surfaces in the order permitting the hypotenuse surface to be used to control the pyramid error and two of the three angles of the prism. In this manner the 45° angles are the ones controlled rather than the 90° angle as desired. Furthermore, by virtue of our novel means for kinematically locating and supporting prisms in a blocking tool, the prism can be accurately positioned to generate any surface in a given angular relation to a previously finished surface, the latter surface controlling the angular relationship of the two during the blocking operation; and the manufacture of prisms is greatly speeded up because the repeated testing of the angle being generated is eliminated.

Let us now consider the manufacture of a right-angle prism which is to be used to give one total reflection from the hypotenuse. If it is rotatable to swing a beam to various angles and if the direction of the beam is to be measured from the rotation of the prism, it is important that the two 45-degree angles be equal to each other. Errors in the 90-degree angle are of little or no importance. Pyramid error is usually important in this application of a right-angle prism.

Therefore, in order to manufacture a right-angle prism for this use the prism should be blocked in a 90-degree blocking groove for the generation of the hypotenuse surface as set forth above in connection with the manufacture of the Porro prism. The second and third 45-degree blocks, however, should both have the two locating bars 14 on the 45-degree wall of the V groove so that the previously finished hypotenuse surface will control the generation of the two 45-degree angles of the prism, and the pyramid error will be controlled with reference to a 45-degree edge as is desired. In fact, it is desirable to use the same 45-degree blocking tool for the generation of the two transmission surfaces of this type of prism, and the prism should even be supported in the same identical groove for second and third side blocking. To accomplish this it is merely necessary to turn the prism, or stick of prisms, end for end in the blocking groove. Thus, if the 45-degree angle is in error in a groove, it will mean that both 45-degree angles on a prism made in that groove will be in error by the same amount, and, therefore, the prism will perform perfectly. Of course, on both the second and third surfaces the plane of grinding should be parallel to the top of the block.

In the Dove prism the light strikes one side of the prism at 45° and is refracted toward the hypotenuse. The hypotenuse totally reflects the light to the third side where it is refracted and leaves at 45° to that side. The deviation is usually zero but may be varied by tipping the prism, and the image is inverted. One application of such a prism is in a panoramic sight to keep the image right side up. The prism can be tilted to adjust the deviation to zero in one direction, but the deviation in the other direction is a function of pyramid angle and cannot be corrected in mounting. It, therefore, turns out that the only angle of any importance for this application is pyramid angle. Therefore, Dove prisms should be kinematically blocked in a 45-degree block for the generation of the last transmission surface, the hypotenuse and first transmission surfaces being previously finished in the order set forth above by being blocked in 90-degree and 45-degree blocks respectively; and careful attention should be given to having the finished 45-degree reference edge supported parallel to the top of the block and to grinding the last transmission surface parallel to the top of the block. In Fig. 7 we have shown the manner in which the Dove prism should be blocked for generation of the last transmission surface. Illustrations of the manner of blocking the prism for the generation of the hypotenuse and first transmission surface of the Dove prism in that order have not been shown, for the reason that they will be substantially the same as the first and second blocking means for the 45°–90° prism previously described, and should be obvious from the description along with the showing of the third and last blocking tool.

The present method and apparatus is also adapted for grinding and polishing of the surfaces of more complicated prisms in order to control a given angle which may be critical. By way of example, we will consider the finishing of the transmission surfaces of a roof prism which requires a pyramidal kinematic locating and supporting system. The roof prism to be considered is shown in Figs. 8, 9, and 10, Fig. 8 being a side view of the prism, Fig. 9 being a plan view of the prism looking down on the transmission surface shown horizontally in Fig. 8, and Fig. 10 being a perspective view of the prism. With this prism, the light enters one transmission surface $T_1$, strikes the first roof surface $R_1$ and is reflected thereby to the second roof surface $R_2$ which in turn reflects it towards the second transmission surface $T_2$ from which it emerges, all as indicated by the ray diagrams shown. A specific problem is to generate the transmission surfaces $T_1$ and $T_2$ perpendicular to the plano-parallel ground sides $S_1$ and $S_2$ of the prism as well as to maintain a 90-degree angle between the two transmission surfaces.

According to the present invention, a set of blocking tools for this type of prism may take the form shown in Figs. 11, 12, 14, and 15. A blocking tool adapted to accommodate a plurality of roof prisms at one time may comprise a block 20 the top surface 21 of which is provided with one or more V-grooves 22 in each of which is mounted a saw-tooth bar 23 of the type shown in Fig. 13.

Referring to Fig. 13, the bar 23 has a plane bottom surface 24 and the top surface is provided with a plurality of similar notches 25 spaced longitudinally thereof into each of which a prism is adapted to be seated. As shown, each notch 25 includes two inclined walls 26 and 27 adapted to accommodate the roof surfaces of the prism. These inclined walls 26 and 27 join vertical walls 28 and 29 which will be substantially parallel to the plano-parallel ground sides $S_1$ and $S_2$ of the prism when the same is seated in the notch. As shown in Figs. 11, 12, 13 and 14, the bar 23 is located in the V-groove with the bottom surface 24 engaging the inclined wall of the groove as the result of which the vertex 30 of each saw-tooth or notch 25, is inclined parallel to the inclined wall of the V-groove. By this arrangement of parts, each notch in the bar 23 in combination with the vertical wall W of the V-groove forms a recess into which a roof prism is adapted to be seated with one of its transmission surfaces exposed above the top surface of the block for grinding and polishing, see Figs. 12 and 15.

The next thing to be considered is how to kinematically block the roof prism in the recesses so that the transmission surfaces can be ground in perpendicular relation to the plano-parallel side walls of the prism and at a true 90-degree angle with respect to each other. According to the present invention this is accomplished by providing a set of two blocking tools for the prism, one for grinding and polishing each transmission face. In the tool for blocking the prism for grinding the first transmission surface, see Figs. 11 and 12, one vertical side wall 28 of the notch 25 is provided with a pair of spaced supporting bars 41 the surfaces of which are machined to define a plane perpendicular to the top of the block. These bars are adapted to engage the plano-parallel side wall $S_1$ of the prism when it is seated in the recess and thereby control the angular relation between the grinding plane and this surface. The vertical wall of the V-groove 22 opposite each recess is provided with a single bar support 32 for engaging one of the rough molded transmission surfaces of the prism, and the inclined wall 27 of the recess is provided with a supporting member 33 of limited area which constitutes a point support for one of the roof surfaces of the prism. Accordingly, when the prism is placed in the recess with one of the transmission surfaces exposed above the top of the block and a downward pressure is applied thereto, cooperation between the single point support and the single bar support will cause the prism to be located in the recess with its plano-parallel ground side in proper engagement with the double bar support, whereby the same will be accurately located in a plane perpendicular to the grinding plane. Therefore, the double bar support, the single line support, and the single point support all in combination constitutes a kinematic pyramidal locating system for the prism. Analyzing this locating system, it will be seen that it consists in locating a body in a definite position of orientation by engaging three different sides thereof by means which constitute a plane support for the one side which is to control the orientation of the body, a line support for another side of the body and a point support for a third side. The line and point supports allow for, and cause, an adjustment of the prism necessary to properly position the controlling side against the plane-defining support, and thereafter cooperate with the plane-defining support to securely hold the prism in the desired position of orientation. In grinding and polishing the second transmission surface of the prism, the prime consideration is to generate a true 90-degree angle between the two transmission surfaces. To do this a second blocking tool of the type shown in Figs. 14 and 15 is used, and this blocking tool differs from the first described blocking tool only in the position of the supporting surfaces for the respective sides of the prism. In this tool the plane-defining supports of the kinematic locating system are to engage the previously finished transmission face of the prism because this is the surface that is to control the 90-degree angle. Accordingly, a pair of horizontal spaced bars 31' are provided on the vertical wall W of the V-groove to engage and locate the transmission surface, previously finished in the first block, the single supporting bar 32' is located on the vertical wall 28' of the recess, and a supporting member 33' of limited area is provided on the inclined wall of the recess which is opposite to the vertical side having the single bar support. The three supporting means constitute a kinematic pyramidal locating system as before, but in this relation of supports the previously finished transmission surface of the prism controls the orientation of the prism instead of the plano-parallel side as before. It might be pointed out that it is important that the resultant force on the surface being finished falls between the points of support for the three surfaces of the prism rather than outside of them, otherwise, the locating system may be kinematically unstable.

From the above description it is believed that the novelty and advantages of a kinematic locating and supporting system for blocking prisms for grinding and polishing will be readily apparent. Such a kinematic system makes it possible to control the orientation of the prism so that the grinding of any surface can be accurately controlled with respect to any other surface, and in addition to the locating feature, provides a support which will securely hold the prism in a desired position of orientation. The blocking system of this type also speeds up the manufacture of optical prisms in that it eliminates the necessity of repeatedly checking the angles of the prism throughout the finishing operation in order to be sure when they are correct. And in addition, by such a system of blocking, pressure on the prism surfaces can be removed from the weak spots, the corners, and the waste due to chipped corners, which is prevalent with prior art procedures where the prisms are over-rigidly supported when blocked, is eliminated. This novel kinematic locating and supporting system, because of its ability to accurately control the orientation of a prism relative to the grinding and polishing plane with reference to a given surface of the prism, makes commercially practical our novel procedure of grinding prisms by means of which the critical angle of a prism, as determined by its function, can be accurately controlled. While we have disclosed our invention in connection with a plurality of specific types of prisms, we believe that the specific examples are sufficiently diversified to clearly indicate that the invention is not limited to a method or apparatus for manufacturing prisms of only the type disclosed, but can be adapted to any type of prism which might be encountered.

Although we have shown and described certain specific embodiments of our invention, we are fully aware that many modifications thereof are possible. Our invention, therefore, is not to be limited to the precise details of construction shown and described, but is intended to cover all modifications coming within the scope of the appended claims.

Having thus described our invention, what we claim as new and desire to secure by Letters Patent of the United States is:

1. A blocking tool for use in grinding and polishing a transmission surface of a roof prism and comprising a block having its top surface provided with a recess of suitable configuration to receive said prism oriented so that the transmission surface thereof to be worked is substantially parallel to and extends above said top surface of the block, a plurality of spaced supports extending from one wall of the recess adapted to engage the other transmission face of the prism and locate it accurately in a plane at right angles to the top surface of the block, an elongated support extending from another wall of said recess and adapted to engage one of the plano-side walls of the prism in a line substantially parallel to the plane defined by said first mentioned spaced supports, and a supporting post extending from a third wall of said recess at an angle to the vertical and inclined toward the line of support provided by said aforementioned supporting means, the end of said post adapted to engage the roof surface of said prism opposed to the plane side wall mentioned, said supporting means for the three surfaces of the prism in combination providing a kinematic locating and supporting means for the prism by virtue of which said second transmission surface is accurately moved into, and held in, engagement with the spaced supports therefor by a resultant downward pressure on the transmission surface of the prism to be ground and polished.

2. A blocking tool according to claim 1, in which the supporting means for the three surfaces of the prism are relatively disposed so that the resultant force on the surface being worked falls between them for the purpose of making the supporting and locating system kinematically stable.

3. A blocking tool for use in grinding and polishing a transmission surface of a roof prism and comprising a block having its top surface provided with a recess of suitable configuration to receive said prism oriented so that the transmission surface thereof to be worked is substantially parallel to and extends above said top surface of the block, a plurality of spaced supports extending from one wall of the recess adapted to engage one plano-side wall of the prism and locate it accurately in a plane at right angles to the top surface of the block, an elongated support extending from another side wall of said recess and adapted to engage the other transmission surface of the prism in a line substantially parallel to the plane defined by said first-mentioned spaced supports, and a supporting post extending from a third wall of said recess at an angle to the vertical and inclined toward the plane of support provided by said aforementioned supporting means, the end of said post adapted to engage the roof surface of said prism opposed to the plano-side wall mentioned, said supporting means for the three surfaces of the prism in combination providing a kinematic locating and supporting means for the prism by virtue of which said plano-side wall of the prism is accurately moved into, and held in, engagement with the spaced supports therefor by a resultant downward pressure on the transmission surface of the prism to be ground and polished.

4. A blocking tool for use in grinding and polishing a transmission surface of a roof prism having at least one surface which is finished and comprising a block having its top surface provided with a recess of suitable configuration to receive said prism oriented so that the transmission surface thereof to be worked is substantially parallel to and extends above said top surface of the block; a plurality of spaced supports extending from one wall of the recess adapted to engage a finished surface on the prism and accurately locate it in a plane at right angles to the top surface of the block; an elongated support extending from another side wall of said recess and adapted to engage a surface of said prism adjacent to said first-mentioned finished surface in a line substantially parallel to the plane defined by said first-mentioned spaced supports; and a supporting post extending from a third wall of said recess at an angle to the vertical and inclined toward one of said aforementioned supporting means and adapted to engage the roof surface of said prism opposed to one of the supported surfaces thereof; said supporting means for the three surfaces of the prism in combination providing a kinematic locating and supporting means for the prism by virtue of which said finished surface of the prism is accurately moved into, and held in, engagement with the spaced supports by a resultant downward pressure on the transmission surface of the prism to be ground and polished.

JOHN H. McLEOD.
JOHN R. TURNER.

REFERENCES CITED

The following references are of record in the file of this patent:

UNITED STATES PATENTS

| Number | Name | Date |
|---|---|---|
| 1,823,537 | Gaudreau | Sept. 15, 1931 |
| 689,933 | Underwood | Dec. 31, 1901 |
| 74,214 | Fosket | Feb. 11, 1868 |
| 2,362,501 | Salabes | Nov. 14, 1944 |
| 1,336,928 | Simmons | Apr. 13, 1920 |

OTHER REFERENCES

Prism and Lens Making, by F. Twyman, pub. 1942. (Copy in Div. 58.)